No. 803,522. PATENTED OCT. 31, 1905.
J. P. BARNES.
CHANGE SPEED GEARING.
APPLICATION FILED FEB. 21, 1905.
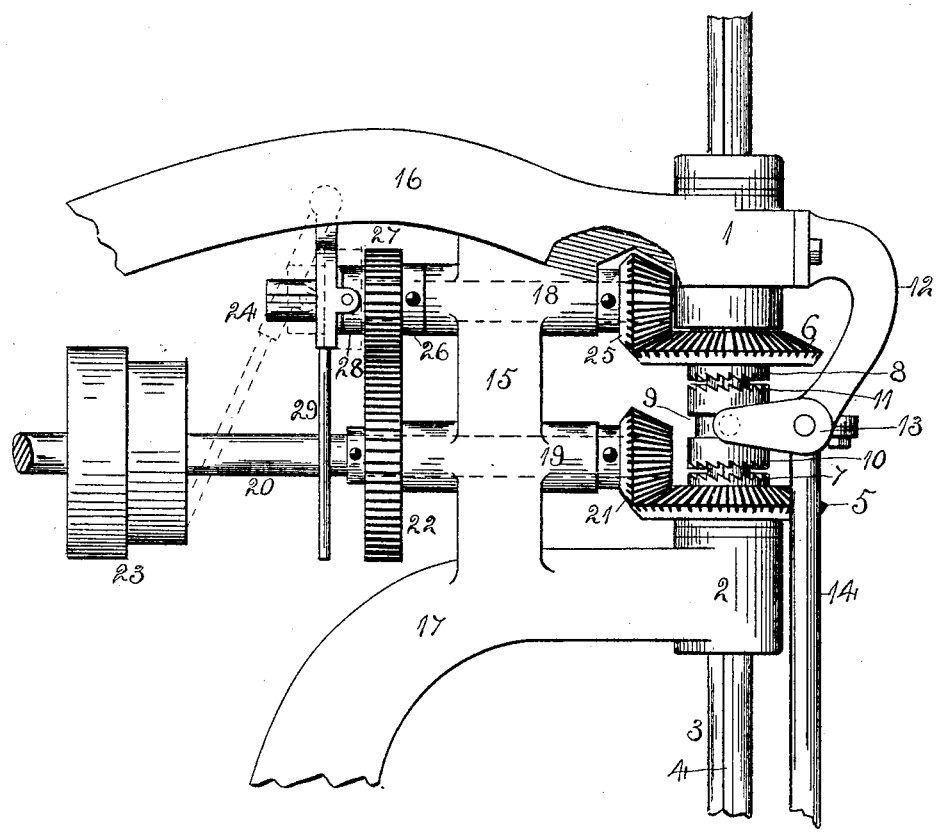

UNITED STATES PATENT OFFICE.

JOSEPH P. BARNES, OF ROCKFORD, ILLINOIS.

CHANGE-SPEED GEARING.

No. 803,522.           Specification of Letters Patent.           Patented Oct. 31, 1905.

Application filed February 21, 1905. Serial No. 246,792.

*To all whom it may concern:*

Be it known that I, JOSEPH P. BARNES, a citizen of the United States, residing at Rockford, in the county of Winnebago and State of Illinois, have invented certain new and useful Improvements in Change-Speed Gearing, of which the following is a specification.

The object of this invention is to construct a drilling-machine having means for rotating the drill-spindle in a direction the reverse to that when used as a drill for the purpose of withdrawing a tap from the work.

In the accompanying drawing is shown a side elevation of my improved drilling-machine.

Only such portion of a drilling-machine is shown in the drawing necessary to give a clear understanding of the construction.

The upper portion of the main supporting-frame has the two vertical bearings 1 and 2, supporting the drill-spindle 3. This spindle is provided with a lengthwise groove 4. The lower bearing 2 supports a beveled toothed wheel 5, located concentric with the drill-spindle. The upper bearing 1 supports a beveled toothed wheel 6, located concentric with the drill-spindle. These two beveled toothed wheels 5 and 6 both face upward and are located some distance apart. The upper face of the beveled toothed wheel 5 is in the form of a clutch 7, and the lower face of the beveled toothed wheel 6 is in the form of a clutch 8. Upon the drill-spindle is located a sliding clutch-section provided with an annular groove 9 and two clutch-faces 10 and 11.

To the upper bearing 1 is secured an arm 12, to the lower end of which is pivoted a fork 13, having the usual connection with the clutch-section. A lever 14 has a connection with the fork, by which the fork is moved, which will move the clutch-section into engagement with either of the beveled toothed wheels or hold it free of both.

A vertical brace 15 connects the top bar 16 and bottom bar 17 of the main frame. This vertical brace supports two horizontal bearings 18 and 19. The lower bearing 19 supports the main driving-shaft 20 and to which are connected the beveled pinion 21, which meshes with the beveled toothed wheel 5, and a spur-gear wheel 22. A cone driving-pulley 23 has a connection with the main driving-shaft. The upper bearing 18 supports a shaft 24, to one end of which is connected a beveled pinion 25. A collar 26 is pinned to the shaft, which prevents endwise movement to the shaft. A spur-pinion 27 has a feather connection with the shaft 24. A collar 28 has a loose connection with the hub of the spur-gear 27, and a lever 29 has a pivotal connection with the upper bar of the main frame, also a pivotal connection with the collar 28, by means of which the spur-gear wheel 27 can be moved out of and into mesh with the spur-gear 22.

When the parts are in the position shown in solid lines in the drawing, the drill-spindle will be at rest. At the same time both beveled toothed wheels are revolving in opposite directions. If the clutch-section is moved into engagement with the beveled toothed wheel 5, the drill-spindle will be rotated for drilling. If the clutch-section be moved into engagement with the beveled toothed wheel 6, the drill-spindle will be revolved in the reverse direction when used in tapping. By means of the lever 29 the spur-pinion 27 will be moved out of mesh with the spur-gear wheel 22, thereby allowing the mechanism imparting a reverse movement to the drill-spindle to remain at rest if the machine is to be used for drilling only. By facing the beveled toothed wheels in the same direction only two spur-gears are necessary in forming a connection between the shafts 20 and 24.

It is evident that instead of the toothed clutch mechanism shown and described friction driving mechanism can be employed without departing from the scope of my invention.

I claim as my invention—

1. In a change-speed gearing, the combination of a main frame, a spindle, two beveled toothed wheels located concentric with the spindle, and facing in the same direction and each provided with a clutch-face, a sliding clutch-section located on the spindle between the beveled toothed wheels, a toothed pinion for each beveled toothed wheel and means for revolving the pinions in opposite directions.

2. In a change-speed gearing, the combination of a main frame, a spindle, two beveled toothed wheels located concentric with the spindle, and facing in the same direction and each provided with a clutch-face, a sliding clutch-section located on the spindle between the beveled toothed wheels, a toothed pinion for each beveled toothed wheel and means for permitting one beveled toothed wheel to remain at rest while the other beveled toothed wheel is revolving.

3. In a change-speed gearing, the combination of a main frame, a spindle, two beveled toothed wheels located concentric with the spindle, and facing in the same direction, and each provided with a clutch-face, a sliding clutch-section located on the spindle between the beveled toothed wheels, a toothed pinion for each beveled toothed wheel, and a gear connection between the beveled toothed pinions.

4. In a change-speed gearing, the combination of a main frame, a spindle, two beveled toothed wheels located concentric with the spindle, and facing in the same direction and each provided with a clutch-face, a sliding clutch-section located on the spindle between the beveled toothed wheels, a toothed pinion for each beveled toothed wheel and a spur-gear connection between the beveled toothed pinions, one of said gears capable of being moved into and out of mesh with the other gear.

5. In a change-speed gearing, the combination of a main frame, a spindle, two beveled toothed wheels located concentric with the spindle and facing in the same direction and each provided with a clutch-face, a sliding clutch-section located on the spindle between the beveled toothed wheels, two shafts, a toothed pinion secured to each shaft and meshing with its respective beveled toothed wheel, and a spur-gear supported by each shaft and meshing together.

JOSEPH P. BARNES.

Witnesses:
   A. O. BEHEL,
   E. BEHEL.